US008613012B2

(12) United States Patent
Boess et al.

(10) Patent No.: US 8,613,012 B2
(45) Date of Patent: Dec. 17, 2013

(54) METHOD AND DEVICE FOR DISPLAYING A MESSAGE ON A SCREEN OF A TELEVISION

(75) Inventors: Arne Boess, Stuttgart (DE); Andreas Beermann, Stuttgart (DE)

(73) Assignee: SONY Deutschland GmbH, Berlin (DE)

(*) Notice: Subject to any disclaimer, the term of this patent is extended or adjusted under 35 U.S.C. 154(b) by 541 days.

(21) Appl. No.: 12/078,387

(22) Filed: Mar. 31, 2008

(65) Prior Publication Data

US 2008/0256573 A1 Oct. 16, 2008

(30) Foreign Application Priority Data

Mar. 31, 2007 (EP) ..................................... 07006772

(51) Int. Cl.
*H04N 7/10* (2006.01)
*H04N 5/445* (2011.01)
*H04N 5/45* (2011.01)

(52) U.S. Cl.
USPC .............. 725/32; 348/563; 348/564; 348/565

(58) Field of Classification Search
USPC ..................... 725/32; 348/563–565
See application file for complete search history.

(56) References Cited

U.S. PATENT DOCUMENTS

| 6,115,482 A * | 9/2000 | Sears et al. .................... 382/114 |
| 6,195,078 B1 | 2/2001 | Dinwiddie et al. |
| 6,359,657 B1 * | 3/2002 | Westerink et al. ............ 348/584 |
| 6,400,371 B1 * | 6/2002 | Helman et al. ................ 345/589 |
| 6,429,883 B1 * | 8/2002 | Plow et al. ..................... 715/768 |
| 6,577,351 B1 * | 6/2003 | Yu et al. ......................... 348/624 |
| 6,956,586 B2 | 10/2005 | Takagi et al. |
| 7,487,529 B1 * | 2/2009 | Orlick ............................. 725/42 |
| 2001/0045982 A1 * | 11/2001 | Okisu et al. ................... 348/211 |
| 2004/0095358 A1 * | 5/2004 | Takagi et al. ................ 345/589 |
| 2005/0040939 A1 * | 2/2005 | Jobes et al. .................... 340/438 |
| 2005/0117060 A1 * | 6/2005 | Minami ...................... 348/589 |
| 2006/0061567 A1 * | 3/2006 | Ouchi .......................... 345/419 |
| 2006/0103667 A1 * | 5/2006 | Amit et al. .................... 345/619 |
| 2008/0175576 A1 * | 7/2008 | Hong et al. ..................... 396/89 |

OTHER PUBLICATIONS

U.S. Appl. No. 12/532,842, filed Sep. 24, 2009, Beermann et al.
Office Action issued Mar. 9, 2011 in China Application No. 200810091849.9 (English Translation).

* cited by examiner

*Primary Examiner* — Jason J Chung
*Assistant Examiner* — Gigi L Dubasky
(74) *Attorney, Agent, or Firm* — Oblon, Spivak, McClelland, Maier & Neustadt, L.L.P.

(57) ABSTRACT

The present invention provides a method for displaying a message on a screen of a television including the steps of displaying a television picture on the screen; displaying the message in a message region of the screen, wherein the television picture is at least partly visible within the message region; and blurring the television picture in the message region.

10 Claims, 17 Drawing Sheets

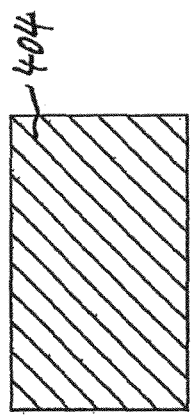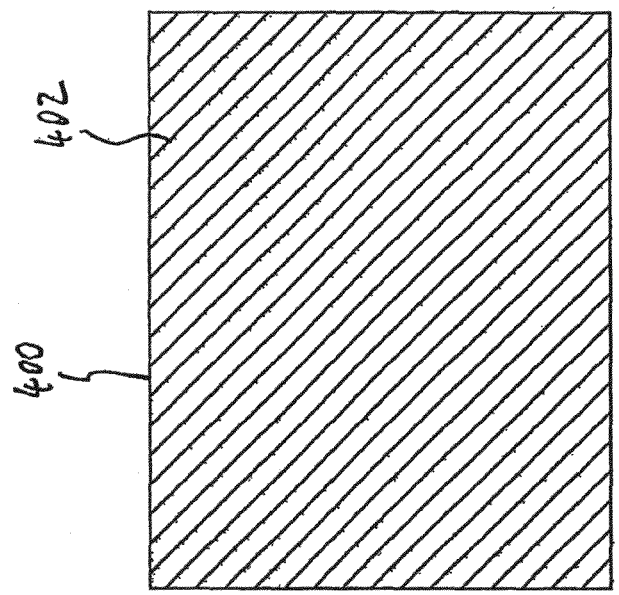
Fig. 4

METHOD AND DEVICE FOR DISPLAYING A MESSAGE ON A SCREEN OF A TELEVISION

CROSS-REFERENCE TO RELATED APPLICATIONS

This application claims priority to the European Patent Application with the Serial Number 07 006 772.3, filed on Mar. 31, 2007.

BACKGROUND OF THE INVENTION

1. Field of the Invention

An embodiment of the invention relates to a method and device for displaying a message on a screen of a television. A further embodiment of the invention relates to a television equipment device for displaying a message on a screen of a television.

2. Description of the Related Art

Today on-screen display (OSD) methods are widely used. For example, an operating menu for controlling functions of a television or television equipment device such as e.g. set top box or a recording device, may be displayed on the screen of the television. Further, program information related to the currently viewed television program may be displayed on screen of the television. Thus, today various messages are displayed on the television screen as a source of information for the user.

It is important that such messages have a high degree of readability.

SUMMARY OF THE INVENTION

It is an object of the invention to provide a method and device for displaying a message on a screen of a television, which message has a high degree of readability.

This object is solved by a method and device according to claims 1, 11, and 14, respectively.

Further details of the invention will become apparent from a consideration of the drawings and ensuing description.

BRIEF DESCRIPTION OF THE DRAWINGS

FIG. 4 shows a television picture and message to be displayed on the television screen;

DETAILED DESCRIPTION OF THE PREFERRED EMBODIMENTS

Figure 1:
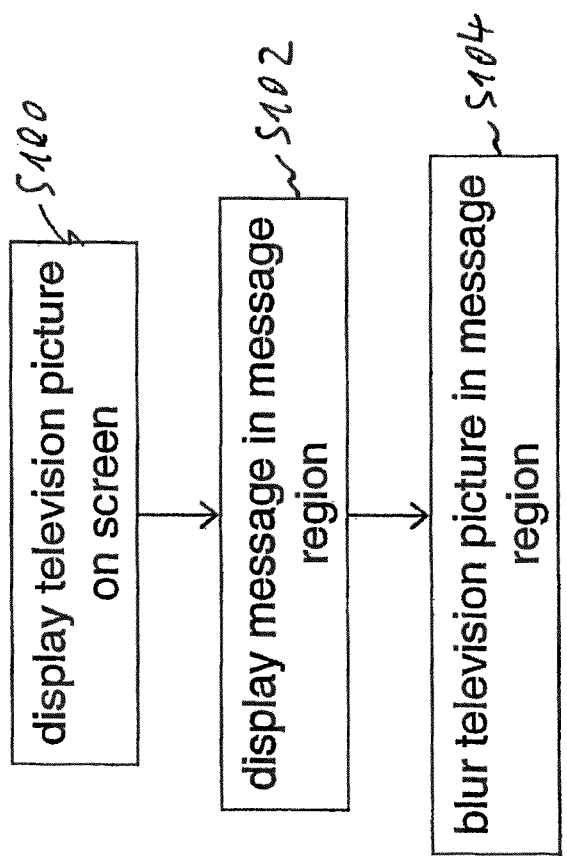
FIG. 1 shows steps of an embodiment of a method for displaying a message on a screen of a television.

In the following, embodiments of the invention are described. It is important to note, that all described embodiments in the following may be combined in any way, i.e. there is no limitation that certain described embodiments or features may not be combined with others.

According to an embodiment of the invention, a method for displaying a message on a screen of a television may comprise: displaying a television picture on the screen, said television picture corresponding to a currently viewed television program, i.e. the television picture may be a moving video picture transmitted by a television broadcast station. The method may further comprise displaying the message in a message region or area of the screen, which message region covers only part of the screen, wherein the television picture is at least partly visible within the message region. The method further comprises blurring the television picture in the message region. The message may be displayed at least partly transparent such that the television picture is still partly visible in the message region. There may be some parts of the message displayed in transparent style and other parts in non-transparent style. For example, the message may comprise text elements that are displayed solid or opaque, i.e. non-transparent, and be surrounded by a box. The box may be displayed partly transparent.

If the message is a text message, the readability of the text message may be high because the sharp edges of the text are better visible because the user may not be distracted by bright colors and/or fast movements and/or sharp edges of the television picture. In other words, because the television picture is blurred within the message region, the user may not be distracted by the background of the message. On the other hand, because the television picture is at least partly visible in blurred style in the message region and still clearly visible in a remaining region of the television screen, the user may have the possibility to continue watching the currently viewed television program corresponding to the displayed television picture. The message and/or message region may be of various shapes, e.g. of rectangular, round, ellipsoid or other shape.

Thus, it is possible that the television picture is only blurred in the message region and not in a remaining region of the screen, i.e. there may be at least a blurred part of the picture in the message region and a clearly displayed part surrounding the message region. Thus, in the remaining region of the screen, the television picture is still clearly shown without any blurring.

According to a further embodiment of the invention, the method may comprise adjusting the degree of blurring. The adjusting may be controllable by the user. Thus, the user may adjust the degree of blurring depending on a predetermined scale. For example, the user may be able to adjust the degree of blurring on a scale from 0 to 5 or 0 to 10. Such values may e.g. be used for "cosmetic" adjustments. This adjustment could also be part of a general setting "increase readability", where also other parameters are adjusted, e.g. font size, contrast, color choice etc.

Further, it may be possible that a color of the television picture is modified in the message region with respect to the remaining screen or also the color or the complete television picture could be modified, e.g. set to black and white picture. The type and/or degree of modifying the color may also be adjusted by the user depending on a respective predetermined scale. If the television picture is e.g. set to black and white, the message region and/or the menu could be displayed in color. This may also enhance readability of the menu.

Further, a size of the message region may depend on a size of the text message. Thus, if a large amount of text needs to be displayed on the screen, the message region may be set to a size sufficiently large to display the text message. On the other hand, if the text message is small, the size of the message region may be set rather small, such that the user may see a large part of the television picture clearly, i.e. without being blurred.

According to a further embodiment of the invention, the television picture may be reproduced in interlaced mode. Thus, the described method may be used within a television set operating according to interlaced mode.

Further, the television picture may also be reproduced in non-interlace mode (progressive scan mode).

A television according to an embodiment of the invention may comprise a screen configured to display a television picture and/or a message, a message processing mechanism configured to receive and/or provide the message, a tuning mechanism configured to provide the television picture and a screen control mechanism configured to display the television picture on the screen and to display the message in a message region of the screen, wherein the television picture is at least partly visible within the message region and further configured to blur the television picture in the message region. Thus, the tuning mechanism may receive a television signal and provide the television picture. Further, the message processing mechanism may be connected to a menu generating mechanism providing a menu of the television to be displayed as a message on the screen. Further, it is also possible that the message processing mechanism be connected to a program providing mechanism providing program information regarding a television program. The message processing mechanism or the program providing mechanism may also receive the message to be displayed from an external server e.g. via an internet connection.

In a further embodiment, the television may comprise a setting mechanism configured to set a degree of blurring. The setting mechanism may comprise a button for increasing or lowering the degree of blurring in the message region.

According to a further embodiment of the invention, a television equipment device such as e.g. a television accessory, set top box, recording device, receiver, tuner or the like, may comprise: a television tuning mechanism configured to tune to a television channel, a message providing mechanism configured to receive and/or generate a message for a user, and a signal processing mechanism configured to generate an output signal, e.g. video output signal, for a television, which output signal causes a television picture of the television channel and the message to be displayed on a screen of the television, wherein the message is displayed in a message region of the screen, the television is partly visible within the message region, and the television picture is blurred only in the message region and not in a remaining region of the screen.

FIG. 1 shows steps of an embodiment of the invention. In a first step S100, a television picture is displayed on a screen. Further, in a second step S102, a message is displayed in a message region of the screen, wherein the television picture is at least partly visible within the message region. Further, in a third step S104, the television picture is blurred in the message region.

Figure 2:
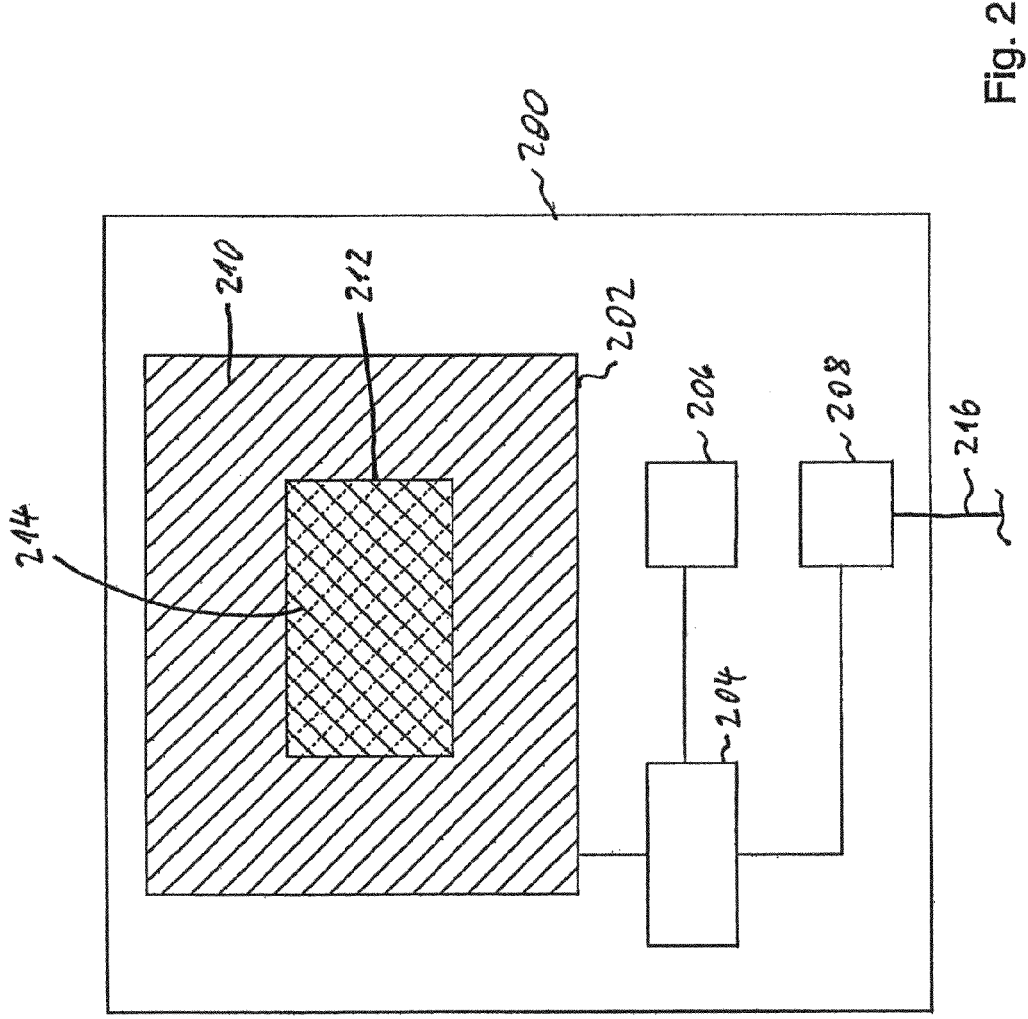
FIG. 2 shows a television according to an embodiment of the invention.

FIG. 2 shows a television 200 comprising a screen 202, a screen control mechanism 204, a message processing mechanism 206 and a tuning mechanism 208.

The screen control mechanism 204 is connected to screen 202 and controls the picture shown on screen 202. The message processing mechanism 206 is connected to screen control mechanism 204 and provides a message 214 to be displayed on the screen 202. The tuning mechanism 208 is also connected to screen control mechanism 204 and provides the television picture 210 to be displayed on screen 202. The tuning mechanism 208 is connected to an antenna cable 216 providing a television signal. Of course, message 214 can be of various shapes, e.g. of rectangular, round or other shape.

Screen 202 is, thus, configured to display television picture 210 and message 214.

The message processing mechanism 206 is configured to receive and/or provide the message 214. The message may be related e.g. to an operating menu of the television or to a television program.

The tuning mechanism 208 is configured to provide television picture 210 e.g. based on a television signal received via antenna cable 216.

Screen control mechanism 204 is configured to display the television picture 210 on the screen 202 and to display the message 214 in a message region 212 of the screen. Thereby, television picture 210 is visible within message region 212, wherein television picture 210 is blurred within message region 212 as indicated by the dotted lines within message region 212.

Figure 3:
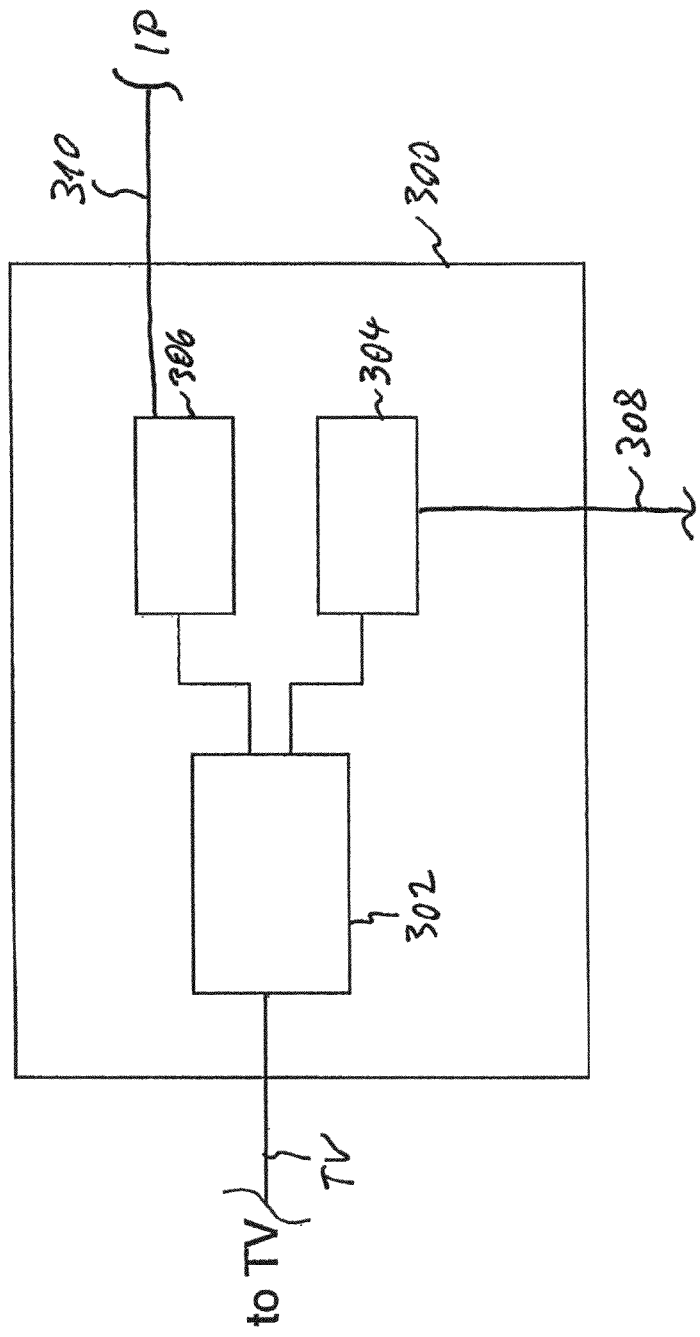
FIG. 3 shows a television equipment device according to a further embodiment of the invention.

FIG. 3 shows a set top box 300 comprising a signal processing mechanism 302, television tuning mechanism 304, and message providing mechanism 306. Signal processing mechanism 302 generates a television signal TV to be provided to a television set (not shown in FIG. 3). Signal processing mechanism 302 is connected to television tuning mechanism 304 and message providing mechanism 306.

Television tuning mechanism 304 is configured to tune to a television channel and provide a television picture. Therefore, television tuning mechanism 304 is connected to an antenna cable 308 providing a television signal. Message providing mechanism 306 is configured to receive and/or generate a message for a user. The message may e.g. relate to a menu of the television or to a television program. The message may be received via said antenna cable 308 and said tuning mechanism 304 or via a further connection 310 providing e.g. a connection to the internet.

Signal processing mechanism 302 is configured to generate the output signal TV for the television, which output signal causes a television picture of said television channel and the message to be displayed on a screen of the television, wherein the message is displayed in a message region of the screen, said television picture is at least partly visible within said message region, and said television picture is blurred only in said message region and not in a remaining region of the screen.

FIG. 4 shows a screen 400 of a television displaying a television picture 402. FIG. 4 further shows a message 404 to be displayed within said television picture 402.

Figure 5:
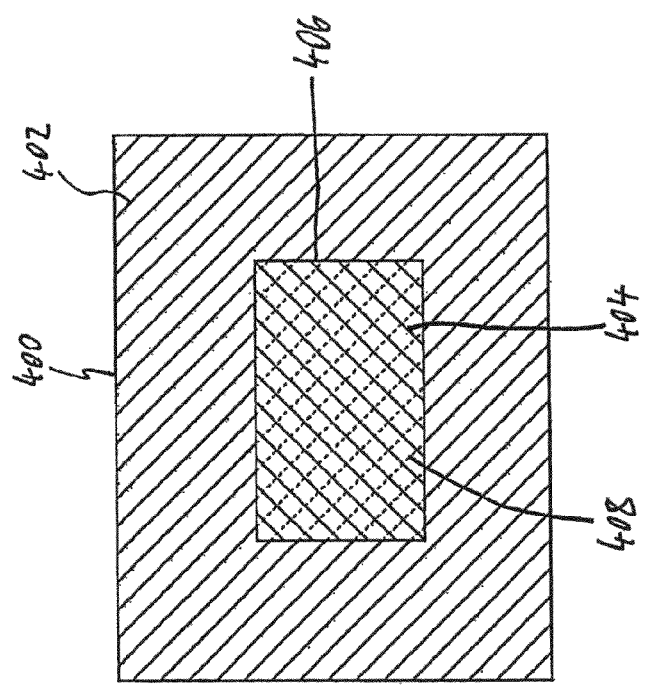
FIG. 5 shows a message displayed in a message region of a television picture, wherein the television picture is partly visible and blurred in the message region.

FIG. 5 shows television screen 400 displaying television picture 402. FIG. 5 further shows message 404 displayed within television picture 402. Message 404 may e.g. relate to a menu of the television or to program information. Message 404 may comprise text elements and graphical elements and has a certain size. The size of message 404 determines the size of a message region 406 within television picture 402. The size of message region 406 may be set depending on the size of the message, i.e. message region 406 may be chosen large enough to properly display message 404. The user may set the size of the message region himself. In this case, e.g. the display size of the message will be adapted to the size of the message region. Therefore, e.g. the size of characters of the message to be displayed may be adapted. The user may therefore control the degree of disturbance by messages. Because the size of the message region can be controlled and further, the picture is still at least partly visible within the message region, the degree of disturbance of a currently shown television program is very low. Thus, even though a message is displayed, the user may still have the possibility of following the television program while at the same time being able to properly read the message due to the high degree of readability.

In FIG. 5 message 404 is displayed in the middle of television picture 402. Of course, it is possible that message 404 be displayed at other positions within television picture 402.

Within message region 406, television picture 402 is partly visible. However, in message region 406, television picture 402 is blurred, i.e. message region 406 comprises a blurred part 408 of television picture 402. Blurred part 408 of television picture 402 comprises no sharp edges as indicated by the dashed lines in FIG. 5.

In a remaining region of television picture 402, i.e. outside of message region 406, television picture 402 is displayed without any blurring as indicated by the solid lines in FIG. 5. Thus, the user may still have the feeling of continuously watching the television program without large disturbance.

Figure 6:
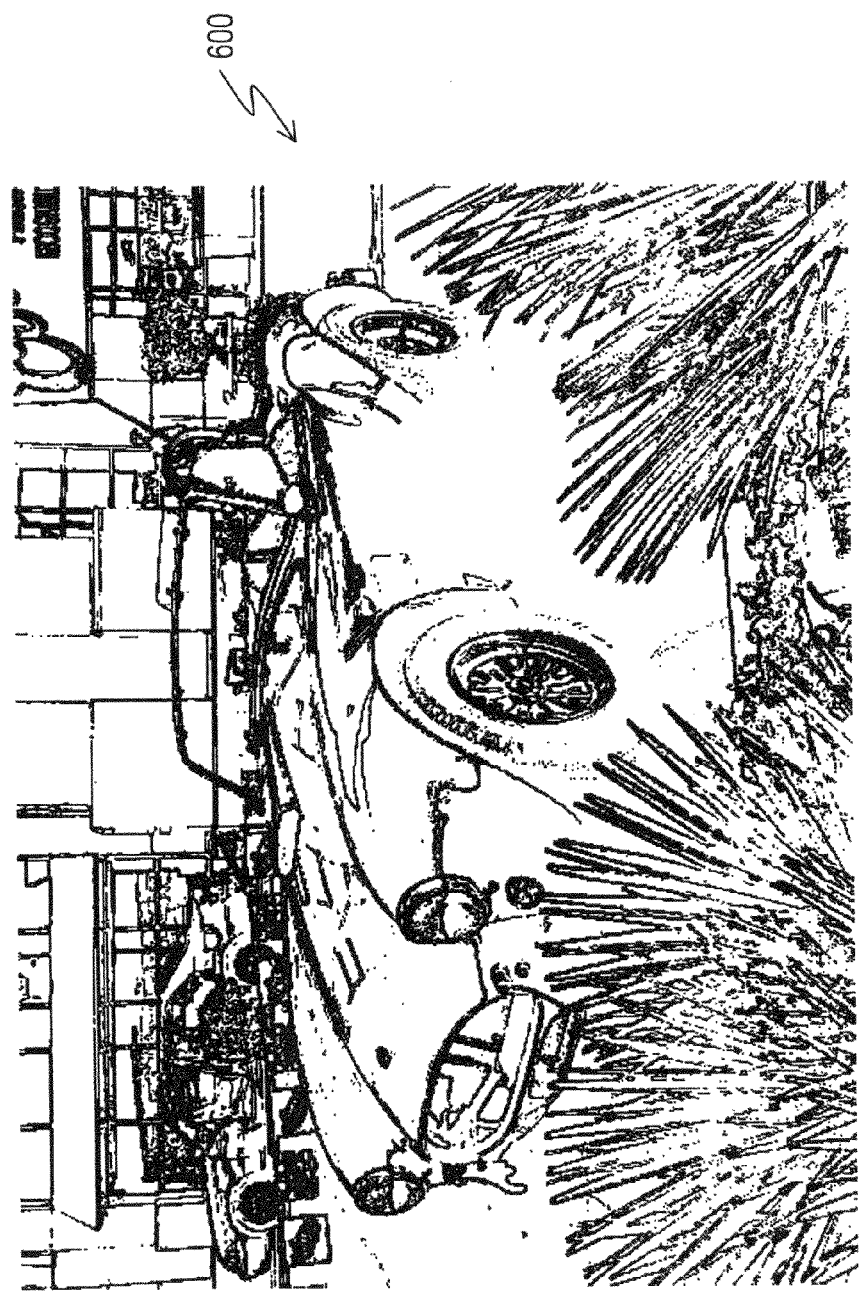
FIG. 6 shows a further television picture.
Figure 7:
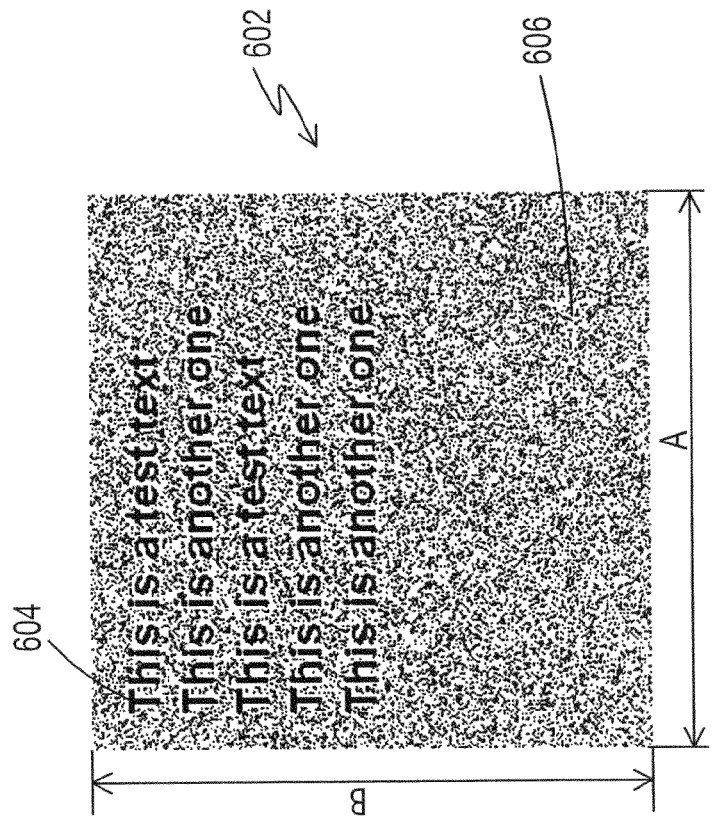
FIG. 7 shows a further message.

FIG. 6 shows a television picture 600 and FIG. 7 shows a message 602 to be displayed within television picture 600. Message 602 comprises text elements 604 and a grey box 606, i.e. a graphical element. Message 602 has a certain size determined by length A and width B of grey box 606.

Figure 8:
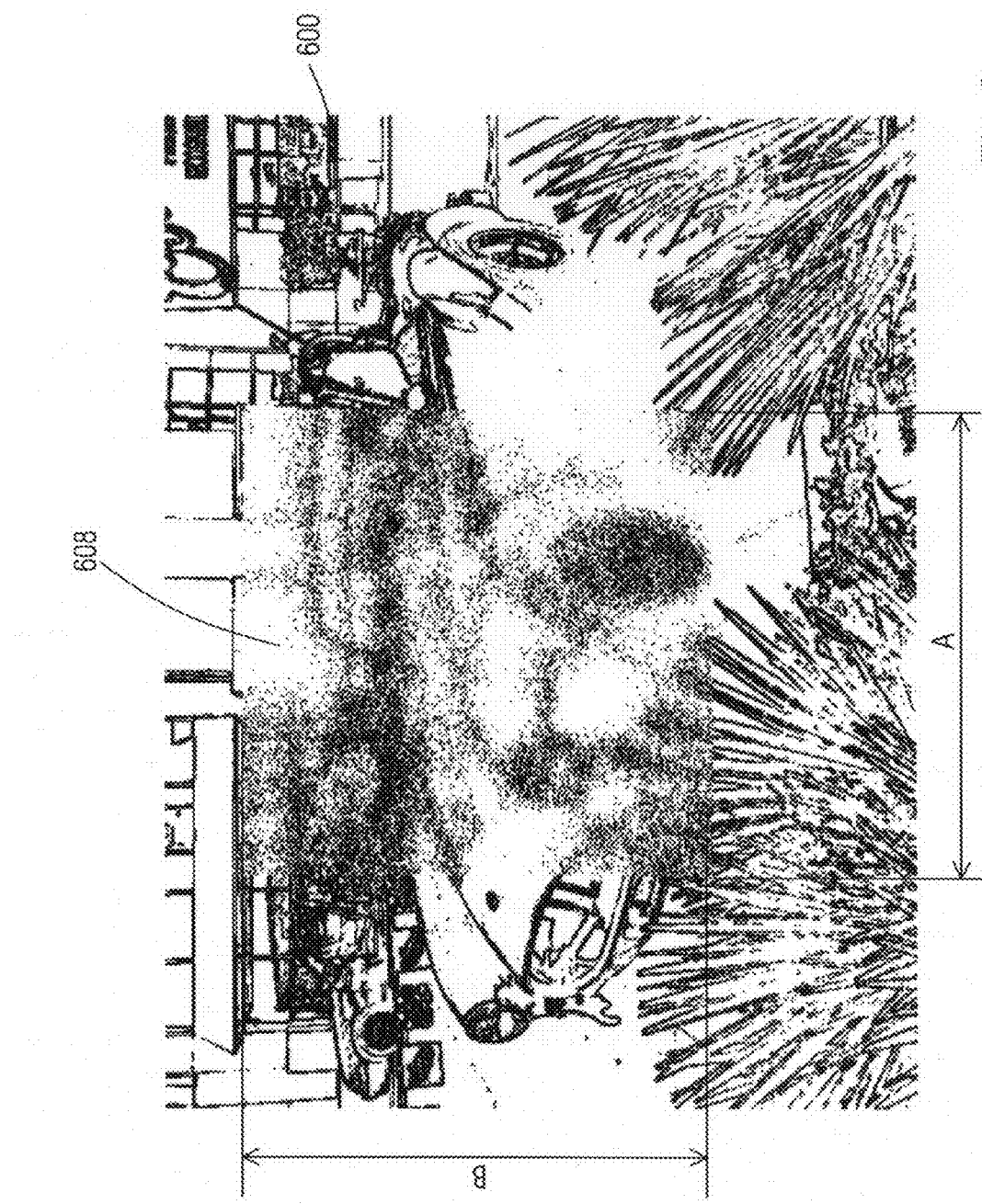
FIG. 8 shows the television picture of FIG. 6 having a message region, wherein the television picture is blurred within the message region.

FIG. 8 shows television picture 600 comprising a message region 608. The size of message region 608 is the same as that of message 602, i.e. message region 608 has the same length A and same width B as grey box 606.

Within message region 608 television picture 600 is blurred. Because of the blurring, television picture 600 appears somewhat softened and not completely sharp.

Figure 9:
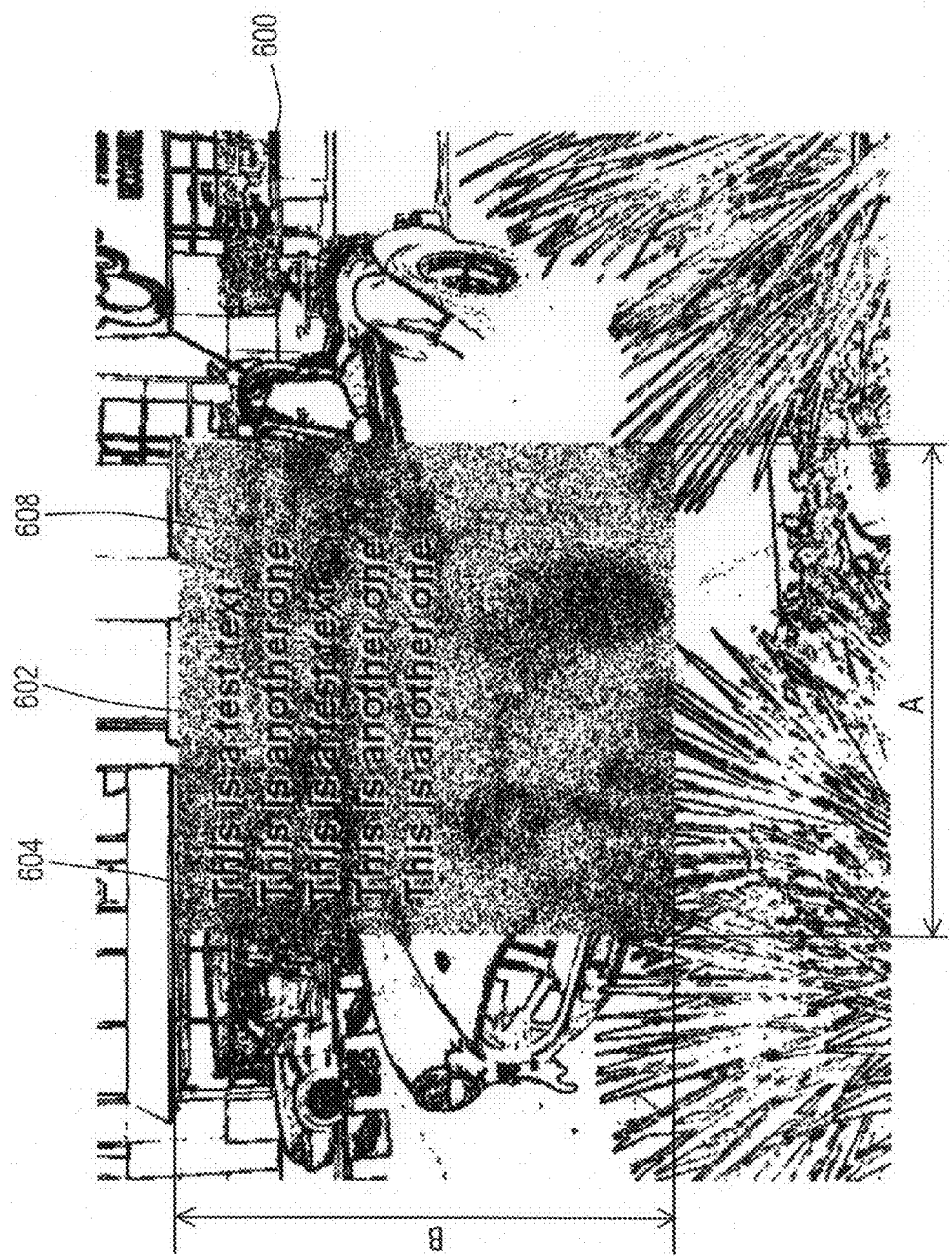
FIG. 9 shows the message of FIG. 7 displayed within a message region of the television picture of FIG. 6, wherein the television picture is partly visible and blurred within the message region.

FIG. 9 shows message 602 displayed within message region 608 of television picture 600.

As seen, message 602 is displayed completely sharp, i.e. text elements 604 comprise sharp edges. On the other hand, television picture 600 is blurred, i.e. contains no sharp edges, within message region 608. Thus, readability of text elements 604 is high.

Figure 10:
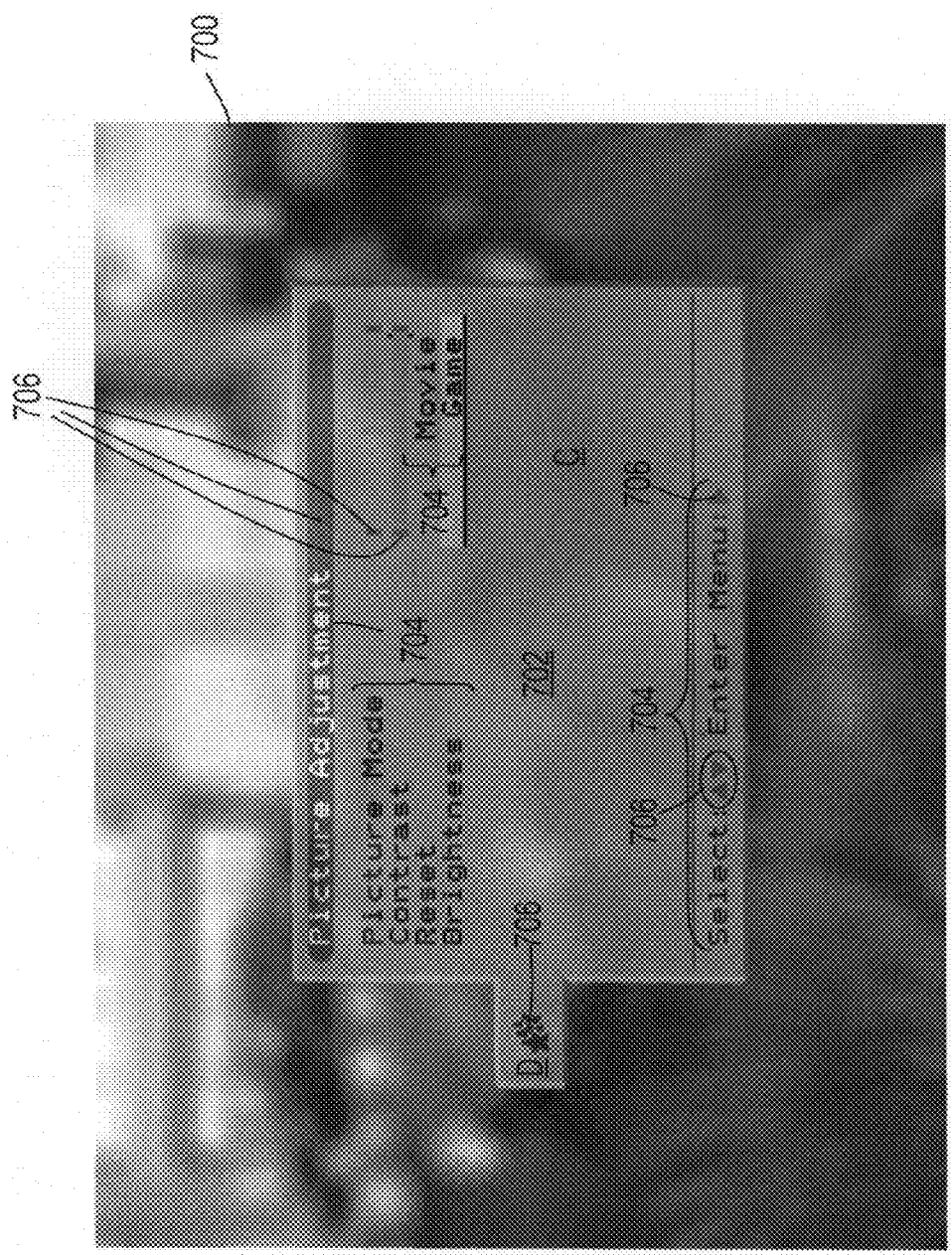
FIG. 10 shows the television menu displayed in a message region of the television picture, wherein the television picture is blurred.

FIG. 10 shows a television picture 700 and message 702. Message 702 comprises text elements 704, graphical elements 706 and two rectangular grey boxes C and D forming a grey background area of message 702.

In the example of FIG. 10, all of television pictures 700 is blurred. Thus, readability of message 702 is high.

Figure 11:
FIG. 11 shows a television picture and message region, wherein the television picture is only blurred within the message region.
Figure 12:
FIG. 12 shows the television menu displayed in the message region of the television picture, wherein the television picture is partly visible and blurred within the message region.

FIG. 11 shows television picture 700 comprising a blurred part 708. Blurred part 708 comprises two rectangular parts C' and D'. Blurred part 708 has exactly the same size and shape as message 702. FIG. 12 shows the message 702 displayed within blurred part 708, i.e. within a message region. Due to the blurring of television picture 700 in the message region, readability of text elements 704 and graphical elements 706 is high.

Figure 13:
FIG. 13 shows the television menu displayed in the message region of the television picture, wherein the television picture is visible and not blurred within the message region.
Figure 14:
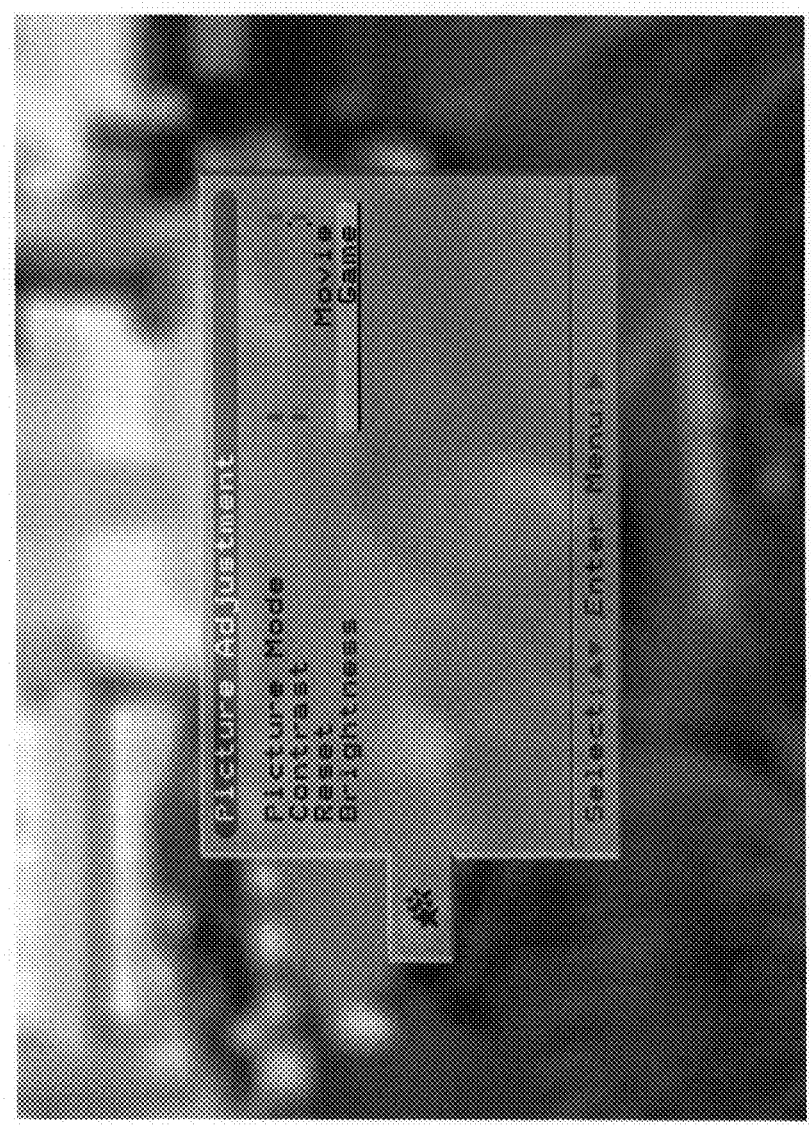
FIG. 14 (in color) shows the television menu displayed in a message region of the television picture, wherein the television picture is blurred.
Figure 15:
FIG. 15 (in color) shows a television picture and message region, wherein the television picture is only blurred within the message region.

In contrast, FIG. 13 shows the same message 702 displayed within television picture 700 without any blurring. As can be seen, readability of text elements 702 and graphical elements 706 is much lower. The user is distracted by the sharp edges of the picture in the background of the message.

FIGS. 14 to 17 show the same examples as FIGS. 10 to 13 in color. As can be seen, the effect is even stronger and readability between blurred and non-blurred version (FIGS. 16 and 17) is even stronger.

Figure 16:
FIG. 16 (in color) shows the television menu displayed in the message region of the television picture, wherein the television picture is partly visible and blurred within the message region.
Figure 17:
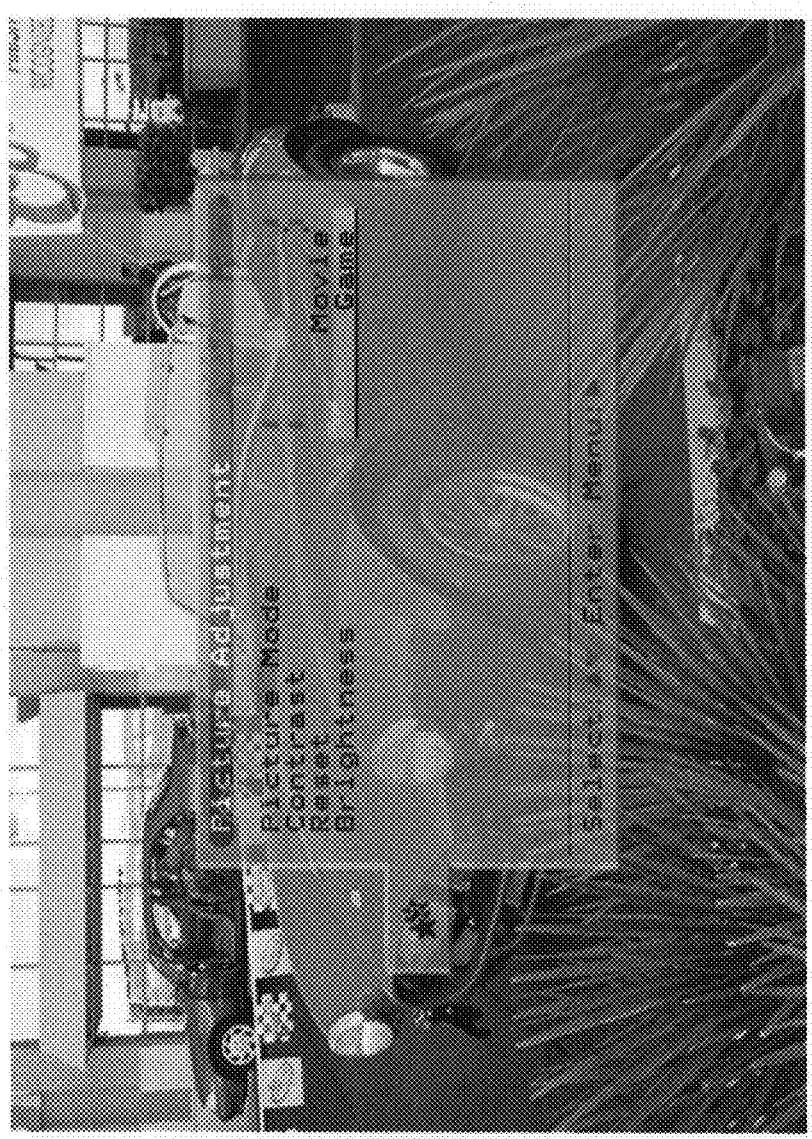
FIG. 17 (in color) shows the television menu displayed in the message region of the television picture, wherein the television picture is visible and not blurred within the message region.

As can be seen throughout FIGS. 14 to 17, message 702 comprises elements in different colors and, due to the blurring in the message region, those colored elements are more easily recognizable than without blurring as may be seen when comparing FIGS. 16 and 17.

As was described above, e.g. television menus with transparent background area usually offer reduced readability of the displayed text information. To improve readability, the live picture, which may be seen through the menu, can be treated, e.g. by diffusion ("out-off-focus").

This allows that the menus become very transparent without decreasing readability too much. Thus, the result looks good and is readable.

By blurring the television picture in the area of the OSD menu/graphics, it is easier to read the sharp edged text without being distracted by bright colors and fast movements of the television picture. On the other hand, the movement and colors of the underlying television picture may still be recognized and form, in connection with the television picture which is not covered by graphics (and is therefore not blurred), a good source of information about what is currently shown.

The invention claimed is:

1. A method for displaying a message on a screen of a television, comprising:
   displaying a television picture on said screen, the television picture appearing in-focus;
   displaying said message in a message region of said screen, wherein said television picture is at least partly visible within said message region by displaying the message region transparently over the television picture;
   rendering said television picture in said message region out-of-focus by blurring said television picture in said message region, wherein outside said message region said television picture is displayed without blurring, and adjusting a degree of blurring so as to adjust a degree of out-of-focus, said adjusting being controllable by the user; and
   modifying a color of the television picture so that the television picture in said message region is rendered in a color that is different from a color of the television picture in a remaining screen region, said modifying modifies the color of the television picture so that the television picture in the remaining screen is rendered in black and white.

2. The method according to claim 1, wherein said message is a text message.

3. The method according to claim 1, wherein the television picture is only blurred in said message region and not in a remaining region of the screen.

4. The method according to claim 1, wherein a size of said message region depends on a size of said text message.

5. The method according to claim 1, wherein said television picture is reproduced in interlace mode.

6. The method according to claim 1, wherein said television picture is reproduced in non-interlace mode.

7. The method according to claim 1, wherein said television picture in said message region is rendered out-of-focus by blurring said television picture to form a blurred part, wherein the blurred part has the same size and shape as the message region.

8. A non-transitory computer readable medium storing instruction code that are configured to cause a computer to execute a method of displaying a message on a screen of a television when executed on the computer, the method comprising:
displaying a television picture on said screen, the television picture appearing in-focus;
displaying said message in a message region of said screen, wherein said television picture is at least partly visible within said message region by displaying the message region transparently over the television picture;
rendering said television picture in said message region out-of-focus by blurring said television picture in said message region, wherein outside said message region said television picture is displayed without blurring, and adjusting a degree of blurring so as to adjust a degree of out-of-focus, said adjusting being controllable by the user; and
modifying a color of the television picture so that the television picture in said message region is rendered in a color that is different from a color of the television picture in a remaining screen region, said modifying modifies the color of the television picture so that the television picture in the remaining screen is rendered in black and white.

9. A television comprising:
a screen configured to display a television picture and a message;
a processor configured to receive and provide said message;
a tuner configured to provide said television picture;
a signal processor configured to display said television picture on said screen to appear in-focus and to display said message in a message region of said screen, the television picture being at least partly visible within said message region by displaying the message region transparently over the television picture, and to render said television picture in said message region out-of-focus by blurring said television picture in said message region, wherein outside said message region said television picture is displayed without blurring, the signal processor being further configured to modify a color of the television picture so that the television picture in said message region is rendered in a color that is different from a color of the television picture in a remaining screen region; and
a setting unit configured to set a degree out-of-focus by adjusting a degree of blurring,
wherein said setting unit is controllable by the user and allows the user to control the degree of blurring, and the signal processor is configured to modify the color of the television picture so that the television picture in the remaining screen is rendered in black and white.

10. A television equipment device comprising:
a television tuner that tunes to a television channel;
a processor that generates a message for a user;
a signal processor that generates an output signal for a television, which output signal causes a television picture of said television channel and said message to be displayed on a screen of said television, wherein said message is displayed in a message region of said screen, said television picture is at least partly visible within said message region by displaying the message region transparently over the television picture, and said television picture is rendered out-of-focus only in said message region by blurring said television picture in said message region, wherein outside said message region said television picture is displayed without blurring, and said television picture appears in-focus in a remaining region of said screen, the signal processor being further configured to modify a color of the television picture so that the television picture in said message region is rendered in a color that is different from a color of the television picture in a remaining screen region; and
a setting unit configured to set a degree out-of-focus by adjusting a degree of blurring,
wherein said setting unit is controllable by the user and allows the user to control the degree of blurring, and the signal processor is configured to modify the color of the television picture so that the television picture in the remaining screen is rendered in black and white.

* * * * *